Nov. 5, 1968
W. STELZER
3,408,815
POWER ASSISTED FLUID MOTOR FOR HYDRAULIC BRAKE SYSTEMS
Filed Dec. 12, 1966
2 Sheets-Sheet 1
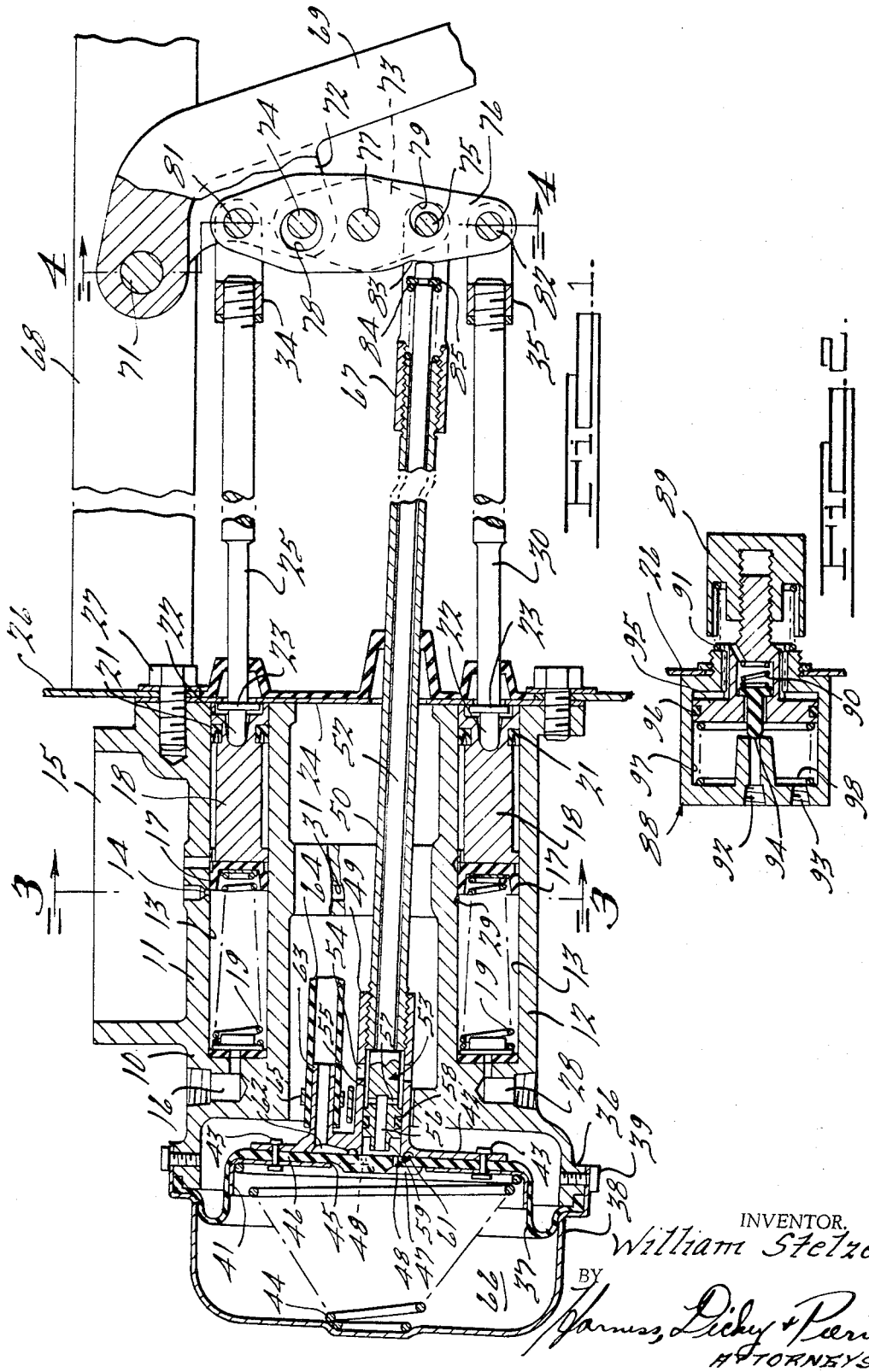
INVENTOR.
William Stelzer
BY
Harness, Dickey & Pierce
ATTORNEYS.

Nov. 5, 1968  W. STELZER  3,408,815
POWER ASSISTED FLUID MOTOR FOR HYDRAULIC BRAKE SYSTEMS
Filed Dec. 12, 1966  2 Sheets-Sheet 2
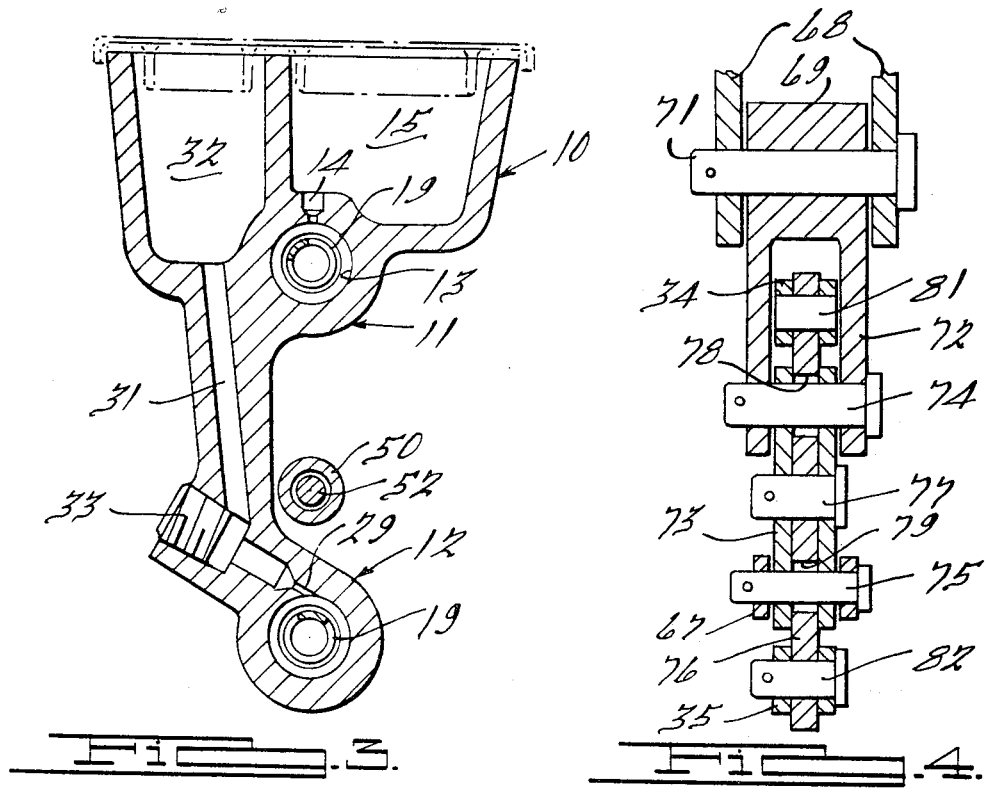
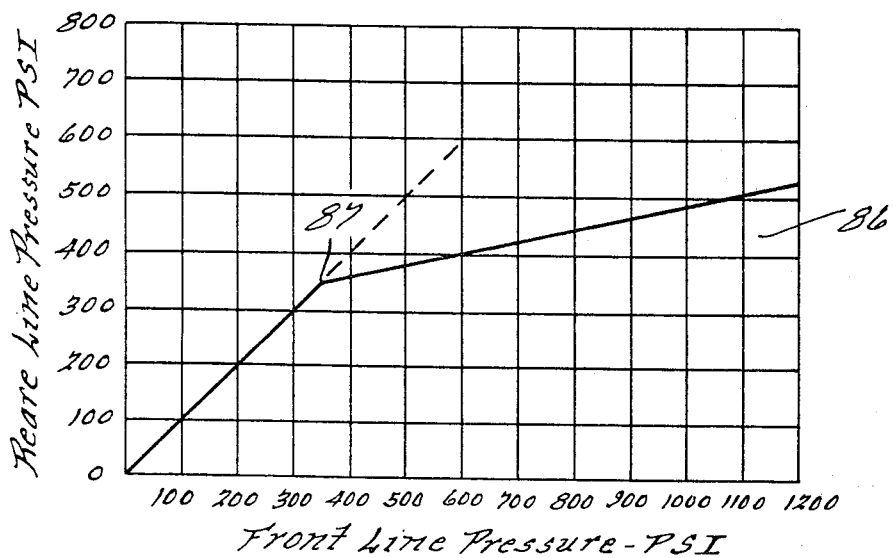
INVENTOR.
William Stelzer
BY
Harness, Dickey & Pierce
ATTORNEYS.

United States Patent Office 3,408,815
Patented Nov. 5, 1968

3,408,815
POWER ASSISTED FLUID MOTOR FOR
HYDRAULIC BRAKE SYSTEMS
William Stelzer, Bloomfield Hills, Mich., assignor to
Kelsey-Hayes Company, a corporation of Delaware
Filed Dec. 12, 1966, Ser. No. 600,983
15 Claims. (Cl. 60—546)

ABSTRACT OF THE DISCLOSURE

An assembly consisting of a dual master cylinder, a power unit, a brake pedal and a pivoted linkage connecting the pedal and power unit to the dual master cylinder. The control valve of the power unit has a control rod connected to the linkage to cause the power unit to deliver a force to the linkage proportional to the applied pedal force during the initial stages of the brake application. By this means, equal forces are delivered to separate actuating rods for the two pistons of the dual master cylinder until a predetermined "power runout" of the power unit is reached, after which one of the actuating rods will receive a greater portion of any further increases in pedal effort due to its relationship to the pedal in the linkage.

---

The foregoing abstract is intended to provide a summary of the nature or gist of the technical disclosure and should not be taken as a definition or limitation of the invention which is defined in the claims.

This invention relates to power operated hydraulic brakes for vehicles and particularly to a hydraulic brake system having a vacuum motor and a variable linkage system operated by the brake pedal.

It has been found desirable in hydraulic brake systems to decrease the pressure of the hydraulic fluid in the brake cylinders of the rear brakes or to increase the pressure delivered to the brake cylinders of the front brakes during higher rates of vehicle deceleration. This is due to the weight transfer of the vehicle in which a portion of the vehicle weight is shifted to the front wheels from the rear wheels during deceleration and as a result of which the front wheels become capable of producing a greater braking effort without skidding. This weight transfer phenomenon is well known in the braking art. It has also been found desirable to employ separate fluid motors or pistons for pressurizing the brake fluid of the front and rear brakes. Finally, it is frequently desired to utilize a power unit to assist the vehicle operator in delivering a brake-applying force to the master cylinder. All of such devices have been known in various separate forms for many years. The present invention, however, serves to combine all three within a unique single package and in a novel manner to compensate for weight transfer, to separately pressurize the front and rear brakes and to provide power assistance for the application of the brakes.

The device of the present invention employs a pivoted linkage to connect a power unit and a brake pedal on the one hand to a pair of piston actuating rods on the other hand. The piston actuating rods engage a pair of pistons of a dual master cylinder while the brake pedal and power unit supply the motive force for moving the master cylinder pistons. The brake pedal and power unit are connected to the opposite ends of a pair of first links which are pivoted at their mid-lengths to the mid-length of a second link. The second link is joined to the actuating rods by pivotal connections at its opposite ends. Normally, the links operate in the manner of "whiffle trees" to equalize the applied loads delivered to the two actuating rods. The power unit has a control valve rod abutting the second link which actuates the power unit when the pedal is operated and arrests the output of the power unit when the ends of the first links connected to the power unit get ahead of the ends of the first links connected to the pedal. The device to function in this manner, equally pressurizing front and rear brakes, continues until the maximum power output of the power unit is reached. This point can be manually regulated by a conventional vacuum control valve or a vacuum control valve that is automatically responsive to the loading of the vehicle.

After the "power runout" of the power unit is reached, the pivot pin by which the pedal is connected to the first links, will advance to directly contact the second link. Subsequent increases in pedal effort will then be transmitted to the second link in a location closer to the actuating rod for the piston that pressurizes the front brakes than to the actuating rod of the piston that pressurizes the rear brakes. Accordingly, the relative pressurization of the front and rear brakes from that point on will be dissimilar.

The main objects of the invention are: to provide a weight transfer compensating device which utilizes a power unit to deliver limited power to the device in which a "power runout" of the power unit is used to initiate a pressure proportioning function, to employ a brake pressure applying assembly having an articulated linkage in which a pressure proportioning function is achieved by an alteration in the point on the linkage at which a portion of the actuating load is applied, to provide a control valve for a power unit used in connection with a variable linkage which is controlled by the relative movement of the parts of the linkage, to provide a combined brake pedal, power unit, variable linkage and dual master cylinder operable to apply power assisted force to the dual master cylinder, and to proportion the relative braking of the front and rear wheels to compensate for weight transfer and to provide an assembly of the above character which is reliable in operation, relatively inexpensive of manufacture and particularly well suited for its intended purpose.

Other objects and features of novelty of the invention will be specifically pointed out or will become apparent when referring, for a better understanding of the invention, to the following description taken in conjunction with the accompanying drawings, wherein:

FIGURE 1 is a sectional view of a pair of master cylinders operated through a link system when pressure is applied by a foot pedal;

FIGURE 2 is a view of a control valve which may be employed with the structure of FIGURE 1;

FIGURE 3 is an enlarged sectional view of the structure illustrated in FIGURE 1, taken on the line 3—3 thereof;

FIGURE 4 is an enlarged sectional view of the structure illustrated in FIGURE 1, taken on the line 4—4 thereof, and FIGURE 5 is a graph showing the same and different pressures applied to the front and rear brakes of the vehicle.

The device of the present invention embodies a housing 10 having a pair of master cylinders 11 and 12 for the front and rear brake cylinders, respectively. The master cylinder 11 has a bore 13 therein communicating through a passageway 14 with a reservoir 15. A passageway 16 is connected by a suitable conduit system to the cylinders for the brakes at the two front wheels. A seal 17 within the bore 13 is urged toward a plunger 18 by a spring 19. The plunger is provided with a seal 21 in engagement with the wall of the bore. The same end of the plunger has a recess for a finger 22 which has an annular flange 23 abutting a closure plate 24. The finger and shoulder are secured to a rod 25 which extends through the plate 24. The closure plate 24 abuts the rear face of a dash panel 26 and is secured thereto by screws 27. A fill plug, not illustrated, is employed for adding fluid to the reservoir 15.

The master cylinder 12 for the rear brakes is of the same construction being provided with a bore 13 containing a spring 19 and an outlet passageway 28, which is connected by a suitable conduit system to the cylinders of the brakes of the two rear wheels. The bore 13 of the master cylinder 12 communicates through an aperture 29 and a passageway 31 to a reservoir 32; the passageway having a fill plug 33, as illustrated in FIGURE 3. The right-hand end of the bore 13 has the seal 17, plunger 18, the seal 21, the recess for the finger 22, the flange 23 of which abuts the closure plate 24. The finger 22 of the cylinder 12 is supported on the end of a rod 30 which has a clevis 35 on its outer end. The rod 25 of the master cylinder 11 has a clevis 34 on its outer end.

The left-hand end of the housing 10 has an annular flange 36 to which a diaphragm 37 and a cup-shaped stamping 38 are secured by screws 39. A flange washer 41 and a plate 42 are secured to opposite sides of the diaphragm 37 by rivets 43. A spiral helical spring 44 is disposed between the washer 41 and the center of the cup 38. The central part of the washer 41 has an aperture 45. It will be noted that the diaphragm portion 46 between the washer 41 and plate 42 is thicker and that the portion within the aperture 45 of the washer 41 has a plurality of strengthening ribs 47 supplied thereon. A plurality of apertures 48 extend through the center of the diaphragm and are annularly disposed about a central portion.

The plate 42 has a threaded hollow cylindrical extension 49 to which a threaded tube 50 is secured. A rod 52 within the tube 50 has a valve 53 on the left-hand end which abuts the end of the tube 50 to limit the outward movement of the rod. The extension 49 has a plurality of passageways 54 through its wall in communication with an annular passageway 55 about the body of the valve 53. The passageway 55 communicates with a forward central passageway 56 through a plurality of passageways 57. The valve is sealed to the inner surface of the place extension 49 by an O-ring 58. With this arrangement the left-hand end of the valve 53 forms a thin walled tubular section 59 which is shown in open relationship to the central part of the diaphragm 37. When in engagement therewith the passageway 56 is sealed from atmosphere. The left-hand end of the extension 49 has an annular groove 61 which is joined by a passageway 62 to the interior of a tube 63 extending outwardly of the plate 42. The tube 63 has a flexible tube 64 secured thereto by a band 65. The tube 64 is connected to a vacuum source (not shown) and is sealed from a chamber 66 formed by the cup 38 when the groove 61 is engaged by the diaphragm 57. As illustrated in FIGURE 1, the end 59 of the valve 53 is out of engagement with the diaphragm and air passes through the apertures 48 into the chamber 66 from the apertures 54. When the valve 53 is moved to the left, it will seal off the passage 56 from the atmosphere and the end 59 will move the diaphragm to uncover all or a portion of the annular passageway 61 so that a vacuum will be applied to the chamber 66 through the apertures 48 and the diaphragm 37 will be urged to the left along with the plate 42, the extension 49 and the tube 50 along with a clevis 67 secured to its outer end.

A support 68 has a foot pedal 69 secured thereto by a pivot 71. The pedal has a lug 72 near its pivoted end secured to spaced links 73 by a pivot pin 74. The opposite end of the links 73 is connected by a pivot pin 75 to the clevis 67. A link 76 of greater length is secured between the spaced links 73 by a pivot pin 77 disposed at the center of the links. Clearance apertures 78 and 79 are provided through the link 76 to permit initial independent movement of the pivot pins 74 and 75 and the links 73 relative to the link 76. A pivot pin 81 connects the upper part of the link 76 to the clevis 34 of the rod 25. A pivot pin 82 connects the lower end of the link 76 to the clevis 35 of the rod 30. A recess 83 is provided in the forward edge of the link 76 against which the end of the rod 52 abuts when urged thereagainst by a spring 84 in engagement with the right-hand end of the sleeve 50 and a split ring 85 carried by the outer end of the rod. It will be noted in this arrangement that the pivot pins 74 and 75 are equidistance from the central pivot pin 77 and that the pivot pins 81 and 82 are also equidistance from the pivot pin 77. It is desirable that this arrangement be employed when equal pressures are required on the front and rear wheel brakes during the initial operation thereof. It is to be understood that these distances may vary so that the pressure variation of fluid in the front and rear brake cylinders may be changed for load variations and the like.

When pressure is applied to the brake lever 69, the links 73 are rotated counterclockwise about the pivot 77 pulling the tube 50 to the right and thereby moving the center portion of the diaphragm 37 into engagement with the sleeve end 59 of the valve 53 which has remained stationary. This shuts off the communication of the chamber 66 with the atmosphere and opens the passageway 61 to the vacuum tube 64. The air within the chamber 66 is evacuated to a degree which moves the diaphragm 37 and plate 42 to the left to exert a force on the link 76 to advance the plunger 18 to the left. If the diaphragm 37 moves too fast it will seal against the plate 42 and close communication between the chamber 66 and the vacuum tube 64. This closing and opening movement will continue until the force applied to the pin 74 will equal that applied by the tube 50 to the pin 75. Thereupon both of the rods 25 and 30 will be moved to the left with like pressure resulting in the same pressures being applied to the fluid in the outlet 16 to the brakes of the front wheel and the passageway 28 to the brakes of the rear wheels. The differential pressure thus produced on the diaphragm 37 and plate 42 cause them to move to the left, pulling the tube 50 within them. By this means, power is delivered to the pin 75 to cooperate with the manual force delivered to the pin 74 in advancing the links 73 and the link 76. The force on the pins 74 and 75 is transferred to the link 73, thence to pin 77, from the pin 77 to the links 76 and thence to the rods 25 and 30 through the pins 81 and 82. Should the tube 50 attempt to advance faster than the brake lever 69 it will advance ahead of the rod 52, causing the diaphragm 37 to close against the plate 42 and block communication of the chamber 66 with the vacuum source. This mode of operation will continue until the diaphragm 37 has delivered its maximum force to the tube 50. This point may be termed the "power runout" and it may be set to occur at any desired level, as will be hereinafter apparent.

In the illustrated device, the "power runout" of the diaphragm 37 occurs at a point 87 on the curve 86 of FIGURE 5. It will be noted that between zero and the point 87 the pressures on the front and rear brakes are equal. As air is evacuated from the chamber 66 the diaphragm portion 46 moves to the left pulling the tube 50 with it. If the tube 50 moves ahead of the sleeve end 59 and the chamber 66 is open to atmospere through the rod 52, the diaphragm will move away from the aperture 56. This opens the chamber 66 to atmosphere and arrests the movement of the diaphragm 37. By this means the tube 50 will exert a force on the linkage equal to the force applied to the linkage by the pedal 69 at the pin 74. After the "power runout" point 87 is reached, the pedal 69 and its pin 74 will move to the left ahead of the pin 75 and the pin 74 will abut the left-hand side of the aperture 78 to apply a force directly to the links 76. This location is much closer to the pin 81 than the pin 82 so the greater percentage of this force will be taken by the rod 25 than the rod 30. The slope of the curve 86 beyond the point 87 shows the increase in pressure on the front wheel brakes relative to the rear wheel brakes resulting from the new location at which further increases in pedal effort are transferred to the links 76.

The curve 86 can be tailored for different loads and vehicles by changing the lever ratios of the links 73 and 76 and by lowering or raising thec utoff point 87. The cutoff point can be selected by varying the vacuum pressure which can be done manually. A conventional pressure regulator can be employed, such as the regulator 88 of FIGURE 2 which is mounted on the dash 26 in position to have a control knob 89 readily accessible to the driver for changing the pressure on a spring 91. The vacuum supply is connected to the inlet port 92 while the tube 64 is connected to the outlet port 93. The supply can be shut off by a stem 94 which is urged by a spring 90 toward sealing engagement with the passageway through the inlet opening 92. A spring 98 abuts a piston 95 within a cylinder 97 and is sealed thereto by an O-ring 96. The springs 91 and 98 position the piston 95 within the cylinder 97 so that it normally holds the stem 94 in an open position. However, if when the vacuum level in the cylinder 97 reaches a preset level, the piston 95 moves to the left to allow the spring 90 to close the stem 94 and prevent any further increase in the vacuum level transmitted to the chamber 66. The point at which the piston 95 moves to the left is lowered by decreasing the compression of the spring 91 which is biasing the piston 95 to the right. It is within the purview of the invention to mount the pressure regulator 88 on the sprung portion of the vehicle and have the spring 91 directly engage the unsprung portion thereof to provide automatic control relative to the change in load of the vehicle. The springs of the vehicle will yield in direct proportion to the load being carried thereby.

The diaphragm 37 and chamber 66 illustrated herein define a fluid motor or power unit and are so termed in the following claims. It will be understood, of course, the various types of power units may be employed, although a vacuum power unit is highly convenient for use on passenger cars.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a vehicle hydraulic brake system, a pair of master cylinders, a power unit, a brake pedal, a first link pivoted at spaced points to said master cylinders, a second link pivoted at spaced points to said power unit and brake pedal, a pivot interconnecting said first and second links between the pivots thereon so that the force applied by the brake pedal energizes said power unit to apply force to said master cylinders simultaneously therewith in the same direction on the opposite side of said interconnecting pivot.

2. A brake system as recited in claim 1, wherein means are provided to permit the initial movement of said second link independent of said first link.

3. In a brake system as recited in claim 2, wherein said first link is of greater length than said second link.

4. In a brake system as recited in claim 3, wherein the independent movement of said second link by said brake pedal actuates said power unit for applying a force to the long link and one of said master cylinders which is equal to the force applied by said brake pedal to the other master cylinder.

5. In a brake system as recited in claim 3, wherein the power unit has a power diaphragm connected to said second link by a tube, a rod disposed within said tube and connected to said control valve, and a spring for urging the rod against said first link to permit said rod and tube to move independently of each other.

6. In a brake system as recited in claim 1, wherein said power unit includes a vacuum chamber connected to a vacuum source, and a change in the degree of vacuum is controllable by an adjustable regulator in a vacuum circuit from said source to said chamber.

7. In a brake system as recited in claim 6, wherein said pressure regulator is mounted between the sprung and unsprung portions of the vehicle so that the supply of vacuum will conform to the change in load on the vehicle.

8. In a vehicle hydraulic brake system, a brake pedal, a pair of master cylinders, each of said master cylinders having a piston and a piston rod connected to the piston thereof, a first link connecting said piston rods, a power unit, a second link connecting said power unit and said brake pedal for jointly operating said first link, and means for limiting the force delivered to said first link by said power unit to a level less than that normally applicable by said brake pedal, the connection of said brake pedal and power unit to said second link being such that one of said master cylinders will be pressurized to a greater degree than the other of said brake cylinders by further increases in the force applied by said brake pedal after said power unit has delivered its maximum force.

9. The structure set forth in claim 8 in which said second link is pivotally connected to said first link between the points of connection of said first link to said rods, said second link is pivotally connected to said brake pedal and power unit on opposite sides of the pivotal connection of said second link to said first link.

10. The structure set forth in claim 9 including a differential pressure responsive movable wall, control valve for regulating the power delivered by said wall, a first control member connected between said wall and one of said links and a second control member connected between said control valve and the other of said links.

11. In a device for regulating the pressure on the cylinders of the front and rear brakes, a master cylinder for supplying pressure fluid to the front brake cylinders, a master cylinder for supplying pressure fluid to the rear brake cylinders, a pair of rods for operating said master cylinders, a first link pivotally connected at spaced points to the rods, a foot pedal, motor means, a second link pivotally connected to said foot pedal and motor means, and a pivot connecting the links together at a point between the pivots thereof to have the motor means apply a pressure to the first link adjacent to one rod in the same direction as said foot pedal applies a pressure adjacent to the other rod.

12. In a device as recited in claim 11, wherein said motor means is a vacuum chamber having a diaphragm and an extending arm which is connected to said second link.

13. In a device as recited in claim 12, wherein the arm is a tube having a spring pressed rod therein which engages the first link, and a valve portion on the opposite end of the spring pressed rod engageable with a valve portion on said diaphragm.

14. In a device as recited in claim 12, wherein means are provided for permitting said second link to initially move independently of said first link.

15. In a device for regulating the pressure on the cylinders of the front and rear wheel brakes, a pair of master cylinders having plungers, a first link having its ends pivoted to said plungers, a brake pedal, motor means, a second link having its ends pivoted to said brake pedal and said motor means, a pivot interconnecting said links adjacent to the midpoint thereof, and means effective after the brake pedal and motor means have applied a predetermined force to the first said link to operate both said plungers to prevent any substantial increase in applied force by said motor means to one said plunger as the brake pedal force increases the force applied to the other plunger.

References Cited
UNITED STATES PATENTS

| | | | |
|---|---|---|---|
| 3,219,259 | 11/1965 | Horton | 60—60 XR |
| 2,957,454 | 10/1960 | Stelzer | 60—54.6 XR |
| 3,302,981 | 2/1967 | MacDuff et al. | 303—6 |

MARTIN P. SCHWADRON, *Primary Examiner.*
ROBERT R. BUNEVICH, *Assistant Examiner.*